United States Patent [19]

Juhlin

[11] 3,978,389
[45] Aug. 31, 1976

[54] SERIES-CONNECTED STATIC CONVERTORS WITH RE-STARTING REGULATOR AFTER FAULT

[75] Inventor: Lars-Erik Juhlin, Ludvika, Sweden

[73] Assignee: Allmanna Svenska Elektriska Aktiebolaget, Vasteras, Sweden

[22] Filed: Mar. 13, 1975

[21] Appl. No.: 558,157

[30] Foreign Application Priority Data
Apr. 5, 1974 Sweden .............................. 7404602

[52] U.S. Cl. .................................. 321/13; 317/16; 317/22; 321/19
[51] Int. Cl.² .......................................... H02M 1/18
[58] Field of Search .............................. 321/11–14, 321/19, 47, 48; 317/13 A, 16, 22, 23; 328/127

[56] References Cited
UNITED STATES PATENTS

| | | | |
|---|---|---|---|
| 2,505,074 | 4/1950 | Trevor | 328/137 |
| 2,666,848 | 1/1954 | Goodwin | 326/137 |
| 3,622,862 | 11/1971 | Boksjo | 321/11 |
| 3,684,945 | 8/1972 | Hermansson et al. | 321/13 |
| 3,821,629 | 6/1974 | Liss | 321/11 |
| 3,848,175 | 11/1974 | Demarest | 321/11 |

Primary Examiner—Gerald Goldberg

[57] ABSTRACT

A static convertor arrangement includes at least two static convertors, the direct current sides of which are series connected and connected to a direct current line, while the alternating current sides are connected to an alternating current network. Each convertor is provided with a control system controlled from a regulator and each convertor is parallel-connected on the direct current side to a short-circuit member. For reconnection of a short-circuited convertor, a starting regulator is provided which is fed by a desired value emitter representing the current present in the arrangement and an actual value emitter which represents the current in the convertor in question. The control system of at least one of the convertors has a contact for switching between the first regulator and the starting regulator. The short-circuit member for one of the convertors is provided with an operating device for opening the member, which is controlled by the current in the short-circuit member.

6 Claims, 2 Drawing Figures

SERIES-CONNECTED STATIC CONVERTORS WITH RE-STARTING REGULATOR AFTER FAULT

BACKGROUND OF THE INVENTION

The present invention relates to a static convertor arrangement comprising at least two static convertors which are connected in series on their DC sides and connected to a DC line, whereas they are connected on their AC sides to an AC network. Each convertor is provided with a control system controlled from a regulator and each convertor is connected in parallel, on the DC side, with a short-circuit member, a so-called by-pass switch.

SUMMARY OF THE INVENTION

The invention relates to devices and systems for re-connection of a convertor after a shortcircuit by means of the short-circuit member. In this connection the short-circuit member must be opened at the lowest possible current and thus the smallest possible arc formation, and a smooth start of the short-circuited convertor as well as a safe quenching of the current in the by-pass switch must be obtained, so that excess voltages and excess currents in the station due to the reconnection are avoided. The invention is thus based on the principle that the short-circuited convertor is de-blocked before the short-circuit member is opened. Then the convertor takes over the current from the short-circuit member which can thereafter be opened in a substantially currentless state. In order to secure a correct commutation of the current from the short-circuit member to the corresponding convertor, a particular starting regulator is provided.

According to the invention, each convertor is provided with a control system controlled from a regulator and has parallel-connected with it on the direct current side a short-circuit member. For reconnection of a short-circuited convertor, there is provided a starting regulator, the input side of which is connected to a desired value emitter representing the current present in the arrangement and an actual value emitter representing the current in the convertor in question. The control system of at least one of the convertors is provided with a contact for switching between the first regulator and the starting regulator.

A voltage signal emitter which represents the voltage across the convertor in question is connected, with the same polarity as the actual value emitter, to the input of the starting regulator. For reconnection of the convertor there is provided a limiting device which temporarily controls the rectifiers of the convertor towards the maximum control angle during the de-blocking.

As the most common example of the convertor arrangement in question one may conceive a convertor station having several convertors, the DC sides of which are series-connected and the AC sides of which are parallel-connected and connected together to an AC network. However, the invention could just as well be applied to more unconventional DC transmissions where series-connected convertor stations with only one convertor occur. Short-circuiting or by-passing of a convertor may de due to temporary disturbances or connection operations, but operational disconnections of a station are also performed by bridging said station.

Brief Description of the Drawings

The invention and its advantages will be described in more detail with reference to the accompanying drawing, where.

DESCRIPTION OF THE PREFERRED EMBODIMENTS

Figure 1:
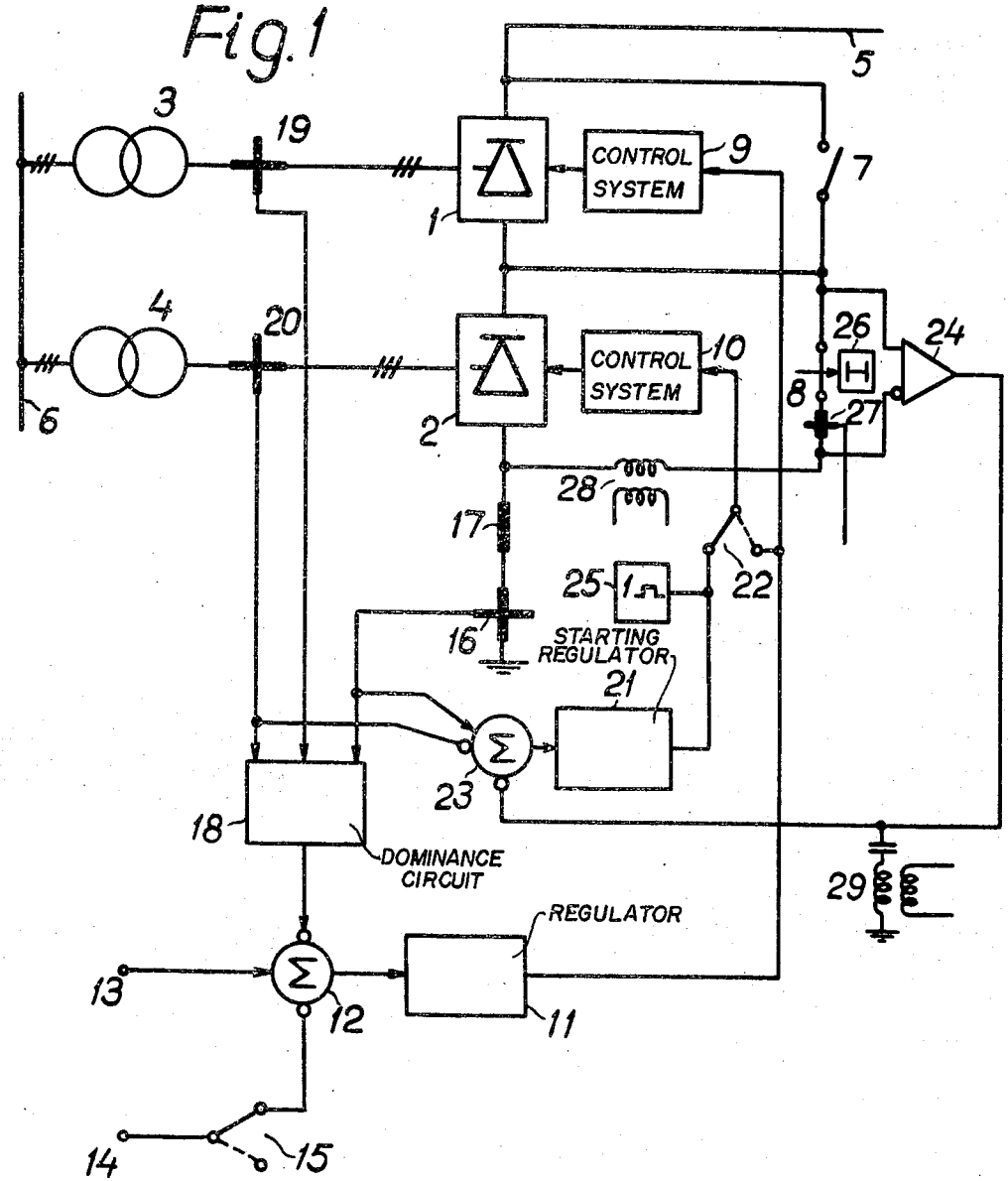
FIG. 1 shows a circuit diagram of a convertor station according to the invention and FIG. 2 shows a variant of the starting connection according to the invention.

FIG. 1 shows a convertor station with two convertors, provided with rectifier bridges 1 and 2, respectively, and convertor transformers 3 and 4, respectively. On their DC sides the convertors are connected in series and connected with one pole to a DC power transmission line 5, the other pole being connected to earth. The convertors are connected in parallel on their AC sides and connected to an AC network 6. Further, each convertor on its DC side is connected in parallel with a short-circuit member in the form of a disconnecting switch or a breaker 7 or 8, respectively. The rectifier bridges 1 and 2 are controlled from control systems 9 and 10, respectively, which feed control pulses on to the various rectifiers, said control pulses having certain phase angles in relation to the commutating voltage. The phase angle is determined in a known manner from a regulator 11 for the entire station.

On its input side the regulator 11 is provided with a summation member 12 whose different inputs are supplied with corresponding signals. To the input 13 there is supplied the current order, that is a signal corresponding to the desired value of the current. To the input 14 there is supplied a signal for current margin for inventing operation. The current margin signal is connected and disconnected by means of a contact member 15 corresponding to inverting and rectifying operation, respectively. A third input of 12 is connected to a current measuring member 16, for example a transductor, in the earth electrode connection of the station. In this connection there is also a smoothing reactor 17 which may be placed on the high-voltage side of the station.

The components described here are quite conventional and necessary for the normal operation of the station. The control systems 9 and 10 can be constructed, for example, according to U.S. Pat. No. 3,551,778.

In order to secure the regulator 11 against possible faults in the current measuring member 16, there is provided a so-called dominance circuit 18 to the input side of which there are connected, besides the member 16, AC measuring members (current transformers) 19 and 20 for both convertors. The members 16, 19 and 20 are connected in parallel and to the circuit 18, which in principle contains corresponding diodes on its input side, by means of which the greatest signal is selected and supplied to the summation member 12.

If a fault occurs in a convertor, or in the event of a service inspection or the like, the convertor is blocked and short-circuited by means of the short-circuit member 7 or 8, respectively, as is shown for the lower convertor. It may also be disconnected from the DC and AC networks by means of disconnecting switches (not shown). In the convertor station at the other end of the line 5 there should be a corresponding disconnection of a convertor to achieve balance between the convertors.

When after this, the convertor is to be connected again, this is done with the help of a starting regulator 21 which is connected by way of a two-way contact 22 to the control system 10 instead of the normal operating regulator 11. The starting regulator 21 has essentially the same construction as the common regulator 11 and the control systems 9 and 10 are suitably constructed in such a way, for example according to the above-mentioned U.S. Pat. No. 3,551,778, that they drive the output signal of the corresponding regulator towards zero by setting the control angle of a convertor.

On its input side, the starting regulator 21 has a summation member 23 to which there are connected the current-measuring members 16 and 20. The signal from 16, that is the current present in the station, is then interpreted as a current order, a desired value, whereas the signal from 20 indicates the current response, the actual value. This causes the convertor 2, 4 after deblocking to increase its current to the same value as the current of the station, which means that the current of the station commutates current from the short-circuit member 8 to the convertor. Since this commutating current only passes through the circuit comprising the low-resistive parts 2, 4 and 8, only a low voltage is needed to drive it, which therefore requires a rather low increase in the control of the convertor 2, 4 for example with a control angle of just a little less than 90°. This means that the current will have a strong ripple so that the current in the member 8 is given the characteristics of an alternating current, and therefore the member 8 can be designed as an AC circuit breaker. As will be explained late, the member 8 is suitably opened after a certain time after the deblocking of the convertor. After this the current response from 20 will be equal to the desired value measured in 16.

To ensure the control after 8 has been opened, the member 23 is provided with an additional input connected to a measuring member 24 which measures the voltage across the rectifier bridge 2. Before 8 has been opened this voltage is zero, but, when 8 has been opened and has become currentless, the strongly pulsating voltage appears that drove the current in the circuit 2, 4, 8. As soon as the signals from 16 and 20 are equal, the regulator 21 will control the convertor 2, 4 at the voltage zero which corresponds to a control angle of about 90°.

After this the convertor 2, 4 can be connected into normal operation by throwing over the two-way contact 22 so that the control system 10 is connected to the normal regulator 11. If the convertor is to be coordinated with the corresponding station at the other end of the line 5, this is previously ensured, for example be deblocking the same number of convertors in both stations so that the contact 22 can be switched over simultaneously in these stations. In this way a balance prevails between the two stations at the moment of switching, that is when the previously blocked convertors are switched over to the normal regulator 11 in the two stations. Because of the difference in current order arising from the current margin, the stations will thereafter automatically be controlled to the correct current and voltage.

The two-way contact 22 is indicated symbolically. In practice, it should be constructed as an electronic change-over switch which provides for a soft change-over between 21 and 11.

In order to have a soft and smooth start of the convertor, a mmonostable flip-flop 25 is arranged in parallel with the starting regulator 21, said flip-flop 25 upon the release of the deblocking signal (see next section) emitting a signal which controls the control system 10 towards the maximum control angle for the rectifiers in 2. After the deblocking, the signal 25 decays so that 21 assumes the control and the current of the convertor 2, 4 is increased at a suitable pace. The starting regulator 21 contains a limit value emitter which, upon starting, limits the control angle of the convertor to a minimum value of about 70°. Further, there should be a limiting circuit, for example in the control system 10, which limiting circuit can be activated together with the contact 22 and which limits the control angle of the convertor during the starting procedure to a lower value which is only slightly below 90° to reduce the risk of short-circuit currents in the low-resistive circuit 2, 4 8. A control angle of about 70° should normally be sufficient to increase the current of the convertor to full current in the circuit 2, 4, 8.

The connection and the start of the members 21 and 25 and the deblocking of the convertor can be performed with a common deblocking signal in a conventional manner, that is to say that it can be made manually, for example after a service inspection, or it can be made as one step in an automatic programmed sequence, for example as a reconnection after an interruption or a disturbance.

The same deblocking signal controls an operating device 26 for the short-circuit member 8, which operating device is suitably constructed with a certain time delay. By dimensioning the members 21 annd 25 in relation to the other circuits, the appropriate period of time for a convertor to take up current, so that a soft start is obtaind, is determined, and the corresponding time delay is set in the operating device 26 so that 8 is opened when the current of the convertor has reached the same level as the direct current in the station. The fact that the convertor has really been deblocked and operates can be indicated, among other things, by the AC component in the convertor current which emanates from the strong ripple appearing in case of control angles of about 90°. This AC component can be easily sensed on the secondary side by a current transformer 28 in series with 8, or by means of the transductor 27 mentioned below.

When the member 8 has been opened, it must be controlled in such a way that it becomes currentless, that is that no arcs remain, which is best performed by observing the voltage across the convertor when applying the starting principle according to the invention. This voltage is measured by means of the measuring member 24 and, since the regulator 21 and the control system 10 endeavor to decrease its DC voltage component to zero, it will have a relatively great AC voltage component if the short-circuit member 8 is currentless. Such an AC voltage component can be sensed by a voltage transformer 29 or by other circuits suitable therefor.

If, some time after the by-pass switch 8 has opened completely, it is still not currentless, the connection of the convertor 2, 4 has failed and the switch 8 must be energized again in accordance with previously known, common principles within the convertor technique, for example according to Swedish Pat. No. 155,780.

The fact that the by-pass switch 8 has become currentless may be sensed, for example, by a measuring transductor 27 in series with the member 8.

Figure 2:
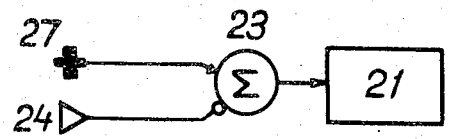

This measuring transductor 27 can also be used for the starting control of 21 instead of the combination of 16 and 20 as indicated in FIG. 2, for the current in 8 is also a measure of the difference between the current in the convertor 2, 4 and the entire station. Thus, in this case the summation member 23 will only have an input signal from 27 and 24, of which one must be zero and the other must deviate from zero. These signals are to be connected with opposite signs and a signal from 23 deviating from zero will be interpreted in the regulator 21 as an error signal influencing the control.

It is clear that the described reconnection of the convertor 2, 4 is independent of whether this is included as one of the convertors in a station having several series-connected convertors or whether it constitutes an independent station connected somewhere on a DC line. Such a station will be achieved if, in FIG. 1, the convertor 1, 3 is removed, and possibly by replacing the ground connection from 16 by an extension of the conductor 5.

I claim:

1. A static convertor arrangement comprising at least two static convertors (1, 3 and 2, 4) wherein the direct current sides of said convertors are in series with each other and connected to a direct current line (5) and the alternating current sides of said convertors are connected individually to an alternating current network (6); each individual convertor connected to an individual control system (9, 10) and said individual control system (9, 10) being connected to and controlled by a common regulator means (11); each convertor on its direct current side being parallel-connected to a short-circuit member (7, 8) upon a fault condition occurrng in said convertor whereupon said convertor becomes short-circuit and non-operational; and circuit means for reconnection of a short-circuit convertor to an operational state comprising a starting regulator means (21) having an input and output, and wherein said output is capable of being connected to a short-circuited convertor by a two-way switch contact (22), said two-way switch contact connecting the individual control system of a convertor alternatively to said starting regulator and said common regulator, and said starting regulating means is provided at its input with a desired value signal representing the current on the direct current side of said arrangement and an actual valve signal representing the current on the alternating current side of said short-circuited convertor.

2. Static convertor arrangement according to claim 1, in which there is connected to the input side of the starting regulator (21) a voltage signal emitter (24) representing the voltage across the convertor in question, which voltage signal emitter is connected with the same polarity as the actual value signal.

3. Static convertor arrangement according to claim 1, in which said actual value signal is provided by a current measuring member (20) on the alternating current side of the convertor (2, 4) and said desired value signal is provided by a current measuring member (16) in series with the arrangement.

4. Static convertor arrangement according to claim 1, in which the said actual value signal and desired value signal are provided by a current measuring member (27) in series with said short-circuit member (8) for the convertor (2, 4).

5. Static converter arrangement according to claim 1, in which the short-circuit member (7, 8) for at least one convertor is provided with an operating device for opening said member and controlled by the current in the short-circuit member.

6. Static convertor arrangement according to claim 1, in which there is provided for reconnection of a convertor a limiting device (25) which temporarily controls the rectifiers of the convertor towards the maximum control angle during the deblocking.

* * * * *